US011800885B2

(12) United States Patent
Shiga et al.

(10) Patent No.: US 11,800,885 B2
(45) Date of Patent: Oct. 31, 2023

(54) METHOD FOR PRODUCING MEAT PROCESSED FOOD

(71) Applicant: NICHIREI FOODS INC., Tokyo (JP)

(72) Inventors: Makiko Shiga, Chiba (JP); Shigetoshi Takasugi, Chiba (JP); Shoichi Hara, Chiba (JP); Minoru Mamiya, Chiba (JP); Toru Iwasa, Chiba (JP); Yuta Kuriyama, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 193 days.

(21) Appl. No.: 17/036,066

(22) Filed: Sep. 29, 2020

(65) Prior Publication Data

US 2021/0007379 A1    Jan. 14, 2021

Related U.S. Application Data

(63) Continuation-in-part of application No. PCT/JP2019/012683, filed on Mar. 26, 2019.

(30) Foreign Application Priority Data

Mar. 30, 2018  (JP) .................................. 2018-070190

(51) Int. Cl.
*A23L 13/70* (2023.01)
*A23L 13/72* (2023.01)
*A23L 13/60* (2016.01)
*A23L 29/206* (2016.01)

(52) U.S. Cl.
CPC ............... *A23L 13/72* (2016.08); *A23L 13/65* (2016.08); *A23L 13/67* (2016.08); *A23L 29/206* (2016.08)

(58) Field of Classification Search
CPC .......... A23L 13/67; A23L 13/72; A23L 13/62; A23L 13/03; A23L 13/65; A22C 17/0053; A22C 17/0026; A22C 5/00
See application file for complete search history.

(56) References Cited

FOREIGN PATENT DOCUMENTS

| JP | 2000-125760 A | 5/2000 |
|----|---------------|--------|
| JP | 2005-253312 A | 9/2005 |
| JP | 2007-209283 A | 8/2007 |
| JP | 2011-250734 A | 12/2011 |
| JP | 2015-223147 A | 12/2015 |
| JP | 2016-67338 A | 5/2016 |
| JP | 2017-209042 A | 11/2017 |

OTHER PUBLICATIONS

International Search Report, issued in PCT/JP2019/012683, dated Jun. 25, 2019.
Written Opinion of the International Searching Authority, issued in PCT/JP2019/012683, dated Jun. 25, 2019.
Japanese Office Action for Japanese Application No. 2019-516728, dated Feb. 21, 2023, with an English translation.

*Primary Examiner* — Vera Stulii
(74) *Attorney, Agent, or Firm* — Birch, Stewart, Kolasch & Birch, LLP

(57) ABSTRACT

The present invention relates to a meat processed food, into which a gel-like material is locally and quantitatively filled. Provided is a method for producing a meat processed food, having a step of cooling a gelling agent solution prepared by adding a gelling agent into water and then heating and dissolving the gelling agent, so as to prepare a gel-like material having fluidity; and a step of filling the gel-like material into a plurality of predetermined positions inside a meat-containing raw material.

7 Claims, 7 Drawing Sheets

METHOD FOR PRODUCING MEAT PROCESSED FOOD

CROSS REFERENCE TO RELATED APPLICATIONS

This application is a Continuation-in-Part of PCT International Application No. PCT/JP2019/012683, filed on Mar. 26, 2019, which claims priority under 35 U.S.C. 119(a) to Patent Application No. 2018-070190, filed in Japan on Mar. 30, 2018, all of which are hereby expressly incorporated by reference into the present application.

TECHNICAL FIELD

The present invention relates to a method for producing a meat processed food such as a hamburger steak or a ground meat cutlet.

BACKGROUND ART

For meat processed foods such as a hamburger steak or a ground meat cutlet, it is important to have juicy texture specific to meats, with which meat juices are overflown from the meat processed foods at the time of biting into the foods, in order to enhance deliciousness and sophisticated feeling. To date, a method comprising chopping a gel-like material with a chopper or the like and then kneading the resultant into a premix composition for a patty of hamburger steak or the like to enhance juicy texture has been generally applied. In addition, it has been known that such juicy texture is further enhanced by increasing the size of a gel-like material to be kneaded to a certain extent. However, these methods have been problematic in that, if the size of a gel-like material to be kneaded is increased, some gel-like material is exposed to the surface and the appearance is thereby deteriorated. It is also possible to fill the gel-like material into a premix composition for a patty or the like by using a filling machine or the like. However, it has been mechanically difficult to quantitatively fill a large gel-like material into a premix composition for a patty or the like, and the weight stability of a product could not be maintained. Moreover, in the case of filling a gel-like material into a premix composition for a patty using a filling machine, the gel-like material has been unevenly distributed in the center (inner layer part) of the premix composition for a patty, and thus, it has been impossible to control localization of the gel-like material at a target site in the premix composition for a patty. On the other hand, in the case of filling (injection) using an injector, etc., such control seems to be possible, but a phenomenon, by which a gel-like material is jammed in the injector or air entrainment occurs, would be generated depending on the hardness or viscosity of the gel-like material. Thus, the filling (injection) using an injector, etc. has been problematic in terms of workability upon the production of meat processed foods.

So far, as a method of using a gel-like material for meat processed products to obtain juicy and favorable food texture, for example, Patent Literature 1 discloses a method of dispersing and mixing jelly comprising gelatin and gellan gum into a meat processed product. However, this jelly is a solid gel, which is cut into a size of 1 to 10 mm and is then added and mixed into a raw material of a meat processed product. As such, this jelly is not a gel having fluidity that can be injected into a meat processed product using an injector, etc. In addition, Patent Literature 2 discloses a food improver comprising curdlan and a polysaccharide thickener such as guar gum or locust bean gum. In Patent Literature 2, examples of a method of mixing the food improver into a meat raw material may include a method of adding the food improver into a food raw material and then kneading the mixture, a method of injecting the food improver into a food raw material, and a tumbling method. However, since curdlan and a polysaccharide thickener are dissolved or dispersed in water and are then used in all of these methods, this food improver is a liquid and is not a gel having fluidity.

CITATION LIST

Patent Literature

Patent Literature 1: JP Patent Publication (Kokai) No. 2007-209283 A
Patent Literature 2: JP Patent Publication (Kokai) No. 2016-67338 A

SUMMARY OF INVENTION

Technical Problem

Accordingly, considering the aforementioned circumstances, it is an object of the present invention to provide a meat processed food, into which a gel-like material is locally and quantitatively filled.

Solution to Problem

As a result of intensive studies directed towards achieving the aforementioned object, the present inventors have found that, by using a gel-like material having fluidity prepared by adding a specific gelling agent into water, then heating and dissolving the gelling agent to obtain a gelling agent solution, and then cooling the gelling agent solution, the gel-like material can be filled into a meat processed food, while controlling the filled positions and the filled amount, and a meat processed food having juicy food texture can be obtained without having a sense of discomfort in the appearance thereof, thereby completing the present invention.

Specifically, the present invention includes the following inventions.

[1] A method for producing a meat processed food, comprising:
  a step of cooling a gelling agent solution prepared by adding a gelling agent into water and then heating and dissolving the gelling agent, so as to prepare a gel-like material having fluidity; and
  a step of filling the gel-like material into a plurality of predetermined positions inside a meat-containing raw material.

[2] The method for producing a meat processed food according to the above [1], wherein the gel-like material has a viscosity of 1.0 to 17.0 Pa·s.

[3] The method for producing a meat processed food according to the above [1] or [2], wherein the filling of the gel-like material is carried out by an injection method.

[4] The method for producing a meat processed food according to any one of the above [1] to [3], wherein the gelling agent is deacylation type gellan gum.

[5] The method for producing a meat processed food according to any one of the above [1] to [4], wherein the gelling agent is used in combination with gelatin.

[6] The method for producing a meat processed food according to any one of the above [1] to [5], wherein the gelling agent is used in combination with a metal salt.

[7] The method for producing a meat processed food according to any one of the above [1] to [6], wherein the concentration of the gelling agent in the gelling agent solution is 0.01% to 2.00% by weight.

[8] The method for producing a meat processed food according to any one of the above [1] to [7], which further comprises a step of cooking the meat-containing raw material filled with the gel-like material, after completion of the filling step.

[9] The method for producing a meat processed food according to the above [8], which further comprises a step of freezing the cooked material, after completion of the cooking step.

[10] The method for producing a meat processed food according to any one of the above [1] to [9], wherein the meat processed food is a hamburger steak, a meatball, a ground meat cutlet, or tsukune (a Japanese chicken meatball).

[11] A meat processed food prepared by filling a gel-like material having fluidity into a plurality of predetermined positions inside a meat-containing raw material.

[12] The meat processed food according to the above [11], wherein the gel-like material has a viscosity of 1.0 to 17.0 Pa·s.

[13] The meat processed food according to the above [12], which is cooked.

[14] The meat processed food according to the above [13], which is frozen.

[15] A method for introducing a gel-like material into a meat-containing raw material, comprising the steps of:
delivering the meat-containing material by a delivery device towards a separating device;
separating by the separating device a predetermined amount of the meat-containing raw material from the meat-containing material delivered; and
introducing the gel-like material into the meat-containing raw material by an introducing device,
wherein a control unit controls the introducing device so that the gel-like material is discharged into the meat-containing raw material.

[16] The method for introducing a gel-like material into a meat-containing raw material according to the above [15],
wherein the separating device comprises a molding die, and the delivery device delivers and fills the meat-containing raw material into a molding space defined by the molding die,
and the introducing device comprises an introduction needle (injector) and introduces a gel-like material at a desired location inside the meat-containing raw material filled into the molding space via the introduction needle.

[17] The method for introducing a gel-like material into a meat-containing raw material according to the above [15],
wherein the introducing device introduces the gel-like material into the meat-containing raw material before being delivered to the separating device, and
wherein the separating device separates the meat-containing raw material into which the gel-like material is introduced.

[18] The method for introducing a gel-like material into a meat-containing raw material according to any one of the above [15] to [17],
wherein the delivery device receives the meat-containing raw material being delivered at a first gauge pressure, and delivers the meat-containing raw material toward the separating device by a second gauge pressure lower than the first gauge pressure.

The present application claims priority from Japanese Patent Application No. 2018-70190, filed on Mar. 30, 2018; and the content disclosed in the description of the aforementioned patent application is hereby incorporated by reference.

Advantageous Effects of Invention

According to the method of the present invention, a meat processed food, in which a gel-like material is localized in a plurality of predetermined positions inside the meat processed food, can be produced. In the method of the present invention, a gel-like material used to provide juicy texture can be injected into a premix composition for a patty of a hamburger steak, etc., by using a device such as an injector, upon the molding of the premix composition for a patty or after the molding of the premix composition for a patty. Accordingly, the method of the present invention is excellent in terms of workability, and is capable of producing meat processed foods having industrially equivalent quality in large quantities. Moreover, the meat processed food produced by the present method provides sufficient juicy texture when it is eaten, and does not have a sense of discomfort in the appearance thereof.

DESCRIPTION OF EMBODIMENTS

Figure 1:
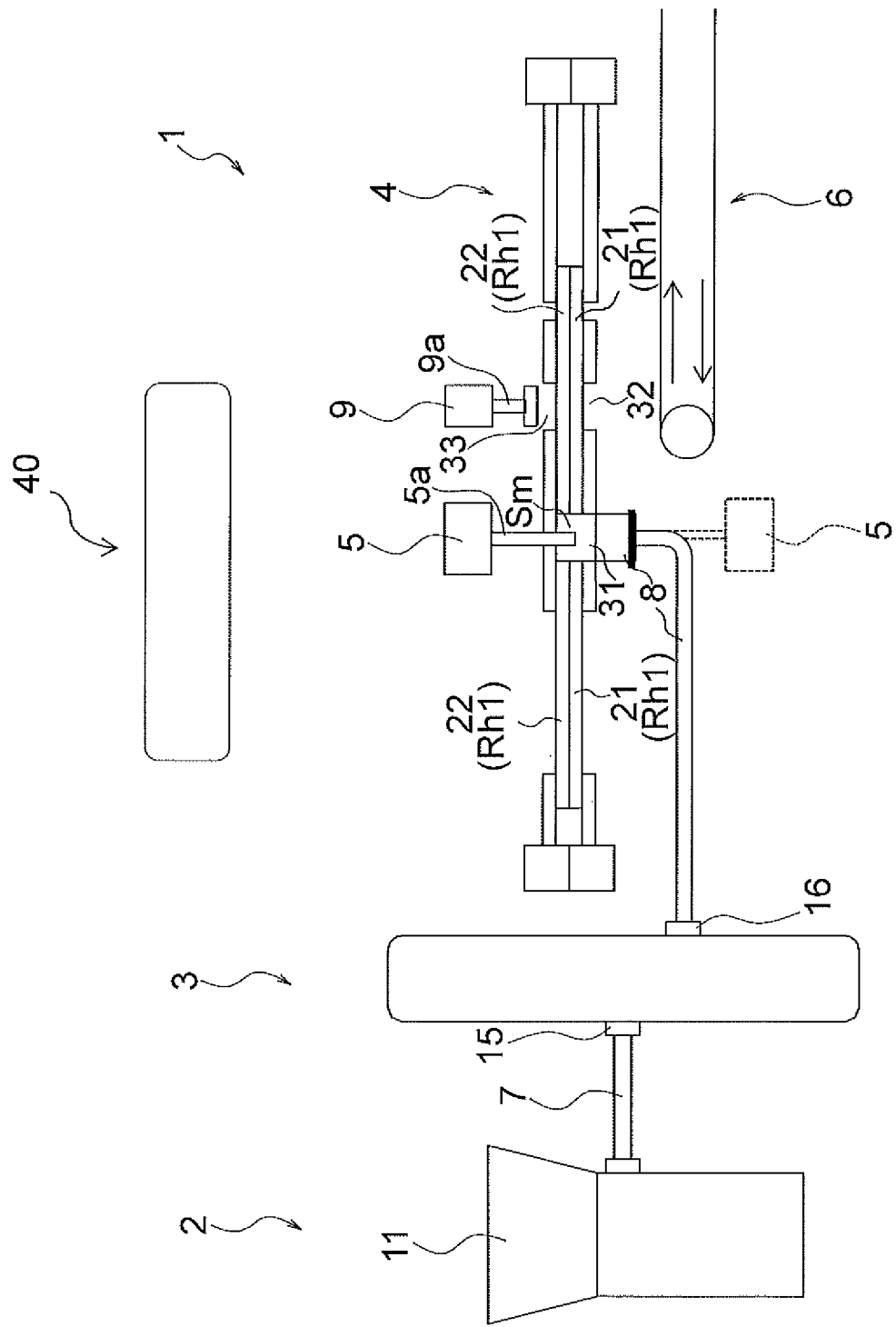
FIG. 1 is a diagram showing an overall configuration of an example of a food (a meat processed food) manufacturing system, and shows a state in which a first molding die and a second molding die are disposed at a first horizontal position.

The method for producing a meat processed food of the present invention comprises: a step of cooling a gelling agent solution prepared by adding a gelling agent into water and then heating and dissolving the gelling agent, so as to prepare a gel-like material having fluidity; and a step of filling the gel-like material into a plurality of predetermined positions inside a meat-containing raw material.

In the present invention, the term "meat processed food" is used to mean a processed food obtained by using meat such as beef, pork or chicken as a main raw material, then, as necessary, mixing the meat with desired auxiliary materials such as onion to mold the mixture into a premix composition for a patty, and then cooking the premix composition for a patty with heat. In addition, a frozen food obtained by freezing the cooked meat processed food is also included in the meat processed food of the present invention. Examples of the "meat processed food" of the present invention may include hamburger steak, meatballs, ground meat cutlet, tsukune (Japanese chicken meatballs), meatloaf, sausage, ham, roll cabbage, steamed chicken, teriyaki chicken (chicken broiled with soy sauce), steamed meat bun, meat dumplings, Chinese steamed meat dumplings (Siu Mai), chicken steak, pork sauté, pork cutlet, and deep-fried chicken.

The method for producing a meat processed food of the present invention (hereinafter also referred to as "the production method of the present invention") will be specifically described below.

First, a gelling agent is added to water, and is then heated and dissolved therein to prepare a gelling agent solution, and thereafter, the gelling agent solution is cooled to produce a gel-like material having fluidity. The term "gelling agent" is used herein to mean a gelling agent, which can be gelatinized by being added to water, being then heated and dissolved therein, and being then cooled, and can form a gel having fluidity. Examples of such a gelling agent may include polysaccharide thickeners such as deacylation type gellan gum, agar, carrageenan, pectin, locust bean gum, xanthan gum, guar gum, tara gum, glucomannan, gum Arabic, karaya gum, tragacanth gum, psyllium seed gum, furcellaran, and pullulan. One or two or more types selected from these polysaccharide thickeners can be used as a gelling agent(s). With regard to all of the above-described gelling agents, commercially available products can be used.

Among the above-described gelling agents, deacylation type gellan gum (also referred to as deacylated gellan gum) is preferable. Gellan gum is a linear heteropolysaccharide constituted with repeating units each consisting of four sugars, namely, two glucoses, one glucuronic acid and one rhamnose. Native-type gellan gum has acyl groups existing in glucoses linked by 1,3-bond (acetyl groups and glyceryl groups), whereas deacylation type gellan gum is formed by removing these acyl groups from the native-type gellan gum. Such deacylation type gellan gum is characterized in that it forms a solid and fragile gel and has high reactivity with cations, and in that the formed gel is excellent in terms of heat resistance, acid resistance, flavor release, and transparency.

The concentration of the gelling agent in the gelling agent solution is different depending on the type of the gelling agent used. The concentration of the gelling agent in the gelling agent solution is preferably 0.01% to 2.00% by weight, more preferably 0.20% to 0.90% by weight, and further preferably 0.30% to 0.50% by weight. By setting the concentration of the gelling agent within the above-described range, the formed gel-like material can have fluidity that is suitable for being injected into a meat-containing raw material with the use of an injector, etc., and can be excellent in terms of filling suitability into a meat-containing raw material. If the concentration of the gelling agent is lower than 0.01% by weight, the viscosity of the formed gel-like material becomes too low, and thus, the gelling agent is unfavorably soaked into the meat-containing raw material. On the other hand, if the concentration of the gelling agent is higher than 2.00% by weight, the viscosity of the formed gel-like material becomes too high, and thus, the gelling agent unfavorably cannot be injected into the meat-containing raw material with the use of an injector, etc.

In the present invention, for the purpose of promoting gelation or controlling the hardness of a gel to be formed, the above-described "gelling agent" may be used in combination with a gelation auxiliary component. The type of such a gelation auxiliary component is different depending on the type of a gelling agent used. For example, when deacylation type gellan gum is used as a gelling agent, gelatin and/or metal salt are preferably used.

When the gelatin is used in combination with the gelling agent, the concentration of the gelatin in the gelling agent solution is preferably 0.10% to 2.50% by weight, and more preferably 0.20% to 1.50% by weight.

When the metal salt is used in combination with the gelling agent, the concentration of the metal salt in the gelling agent solution is preferably 0.05% to 0.40% by weight, and more preferably 0.10% to 0.40% by weight. The metal salt used in combination with the gelling agent may be either a divalent metal salt or a monovalent metal salt. Examples of such metal salt may include calcium salt, magnesium salt, sodium salt, and potassium salt. The metal salt used herein is preferably a divalent metal salt, and is more preferably calcium salt. Specific examples of the metal salt that can be used herein may include calcium chloride, calcium sulfate, calcium phosphate, calcium lactate, calcium carbonate, beef bone calcium, eggshell calcium, calcium citrate, calcium phosphate, magnesium sulfate, magnesium phosphate, sodium chloride, sodium lactate, and potassium chloride.

In the present invention, the term "gel-like material" is used to mean a gel having fluidity, which is obtained by cooling a gelling agent solution prepared by adding the above-described gelling agent into water and then heating and dissolving the gelling agent therein. As such, the gel-like material used in the present invention does not include, what is called, gel that has viscosity and hardness and is solidified into a jelly-like state. The thermal dissolution temperature is not particularly limited, as long as it is a temperature that is equal to or higher than the melting point of the gelling agent used. Thus, the thermal dissolution temperature can be changed, as appropriate, depending on the type of the gelling agent. The thermal dissolution temperature is preferably 60° C. to 95° C., more preferably 70° C. to 90° C., and further preferably 75° C. to 85° C. In addition, the heating time is generally approximately 1 to 60 minutes, and it may be adjusted, as appropriate, depending on the heating temperature. Moreover, heating and dissolution is preferably carried out, while stirring. For cooling, the gelling agent solution may be cooled by natural cooling, or a vessel containing the gelling agent solution may be cooled in ice water, or the gelling agent solution may also be cooled in a refrigerator. Further, the cooling may be carried out while stirring or while being left at rest. The cooling temperature is not particularly limited, as long as it is a temperature that is equal to or lower than the gelation point of the gelling agent used. The cooling temperature can be changed, as appropriate, depending on the type of the gelling agent. The cooling temperature is preferably 1° C. to 35° C., more preferably 10° C. to 30° C., and further preferably 15° C. to 25° C.

The above-described gel-like material is characterized in that it has a viscosity of 1.0 to 17.0 Pa·s, preferably 2.0 to 10.0 Pa·s, and more preferably 3.0 to 8.5 Pa·s. The viscosity can be measured, for example, using Viscometer Type C (Toki Sangyo Co., Ltd.), with Rotor No. 3 or No. 4 included therewith (rotation number: 200 rpm). Herein, the term "viscosity" means a value measured at a temperature of 2° C. to 30° C. When the viscosity of the gel-like material is within the above-described range, the gel-like material has fluidity that is suitable for being injected into the meat-containing raw material using an injector or the like, and thus, the gel-like material is excellent in terms of filling suitability into the meat-containing raw material. In contrast, if the viscosity of the gel-like material is lower than 1.0 Pa·s, the gel-like material is soaked into the meat-containing raw material due to too low viscosity. If the viscosity of the gel-like material is higher than 17.0 Pa·s, the gel-like material unfavorably cannot be injected into the meat-containing raw material using an injector or the like due to too high viscosity. The viscosity can be adjusted depending on the type of the gelling agent used, the combination thereof, and the amount of the gelling agent used.

The content of the gel-like material in the meat processed food is preferably 1% to 15% by weight, and more preferably 2% to 8% by weight. If the content of the gel-like material is smaller than 1% by weight, it causes poor juicy texture. If the content of the gel-like material is larger than 15% by weight, the shape retention and food texture are deteriorated.

Next, the obtained gel-like material is filled into a plurality of predetermined positions inside a meat-containing raw material.

Examples of the meat used in the present invention may include: livestock animal meats such as beef, pork, mutton, horse meat, venison, chevon, and rabbit meat; and poultry meats such as chicken, turkey, duck, and goose. Among these meats, one type of meat may be used alone, or two or more types of meats may be mixed with one another and may be used. The meat-containing raw material may comprise meat as a main raw material, and may also consist of 100% of the meat. The meat may be processed into the form of a minced meat, or a meat block may be cut into a meat portion having suitable size and thickness. Processing into the form of a minced meat can be carried out according to an ordinary method, and for example, a block-like or flake-like meat may be finely ground using a cutter, a chopper, etc., to prepare a minced meat. The grain diameter of the minced meat can be selected, as appropriate, depending on the type of the meat processed food. For example, in the case of a hamburger steak, meatballs or the like, it is desirable to uniformly process the block-like or flake-like meat into a minced meat having a mean grain diameter of 1 to 12 mm.

In addition, raw materials other than the meat used as a main raw material can be selected, as appropriate, depending on the type of the meat processed food. Thus, the raw materials other than the meat are not particularly limited, as long as they are generally used in meat processed foods. Examples of such auxiliary materials may include vegetables (onion, spring onion, cabbage, Chinese cabbage, carrot, green bell pepper, Chinese radish, lotus root, burdock, perilla, celery, parsley, eggplant, potato, sweet potato, pumpkin, etc.), nuts (almonds, peanuts, walnuts, cashew nuts, etc.), mushrooms (shimeji mushrooms, shiitake mushrooms, mushrooms, eringi, maitake mushrooms, etc.), beans (soybeans, peas, lentils, chickpeas, etc.), and ingredients such as tofu and cheese. Examples of other raw materials may include bread crumbs, milk, eggs (e.g., whole egg, yolk, egg white, etc.), flours (flour, barley flour, rice flour, soba flour, corn flour, etc.), starches (wheat starch, potato starch, rice flour starch, corn starch, etc.), fats and oils (soybean oil, rapeseed oil, palm oil, corn oil, sesame oil, flaxseed oil, peanut oil, safflower oil, cottonseed oil, etc.), condiments (common salt, sugar, soy sauce, miso, brewed vinegar, mirin, Worcestershire sauce, curry powder, tomato puree, amino acid seasoning, nucleic acid seasoning, organic acid seasoning, alcoholic drinks, protein hydrolysate, extracts, etc.), spices (black pepper, white pepper, nutmeg, paprika, garlic, ginger, allspice, cloves, Japanese pepper, etc.), and herbs (basil, oregano, rosemary, parsley, etc.). In addition, additives such as a binder, an extender, a color former, an excipient, an emulsifier, an antioxidant, or a perfume may be appropriately mixed with the aforementioned raw materials, as necessary. Such raw materials other than the meat may be used alone as a single type, or may also be used in combination of two or more types.

When the meat is in the form of a minced meat, a premix composition for a patty (hereinafter, occasionally referred to as "patty") is generally produced from the minced meat. Such a patty is produced by adding raw materials other than meat into the meat, and then kneading them. Such a production method may be changed, as appropriate, depending on the type of a meat processed food. The term "premix composition for a patty" or "patty" is used herein to mean a mixture consisting of the above-described meat and other raw materials, from which a coating portion is excluded, namely, the patty means, what is called, content. Therefore, in the case of a ground meat cutlet, the patty means a content that is not coated with a coating portion, and the patty of the ground meat cutlet has almost the same composition as that of a hamburger steak.

The method of kneading raw materials including a meat is not particularly limited, as long as all of the raw materials are uniformly mixed with one another. The raw materials may be kneaded by hand work, or may also be kneaded using a mixing machine generally used in the food field, such as a mixer or a kneader. Conditions such as a kneading speed or a kneading time are not particularly limited, either, and such conditions may be determined, as appropriate, depending on the type of a meat processed food, and the types or amounts of raw materials used.

In the present invention, the gel-like material can be filled into the meat-containing raw material according to, for example, an injection method. Any injection method may be adopted herein, as long as it can localize the gel-like material having fluidity in the meat-containing raw material and can quantitatively inject the gel-like material into the meat-containing raw material. Thus, such injection can be carried out, for example, using an injector such as a syringe, or using an injector that is commonly used to inject a liquid material such as a pickle liquid or a seasoning liquid into a meat in the meat processing field. The shape of an injector, such as the thickness of a needle, can be selected, as appropriate, depending on the properties of the gel-like material or the meat-containing raw material. The temperature of the meat-containing raw material upon the filling of the gel-like material therein is preferably −5° C. to 20° C.

In addition, when the above-described patty is used as a meat-containing raw material, simultaneously with the molding of the patty into a predetermined shape or after completion of the molding, the gel-like material is filled into a plurality of predetermined positions inside the patty. The method of molding the patty is not particularly limited, and for example, the patty may be formed into a predetermined shape by hand work, or the patty may be filled into a mold for forming a predetermined shape (e.g., a die cutting made of stainless steel). Industrially, it is preferable to use, for example, a commercially available automatic molding machine or the like to mold the patty into a predetermined shape. The shape of the patty may depend on the type of a meat processed food. Examples of the shape of the patty may include an elliptical shape, a round shape, a spherical shape, and a rod shape. In the case of a hamburger steak, the shape of the patty thereof is generally an elliptical shape having a major axis of 50 to 200 mm and the maximum thickness of approximately 10 to 30 mm. Further, the structure of the molded patty may be either a monolayer structure or a multilayer structure consisting of two or more layers.

In the present invention, the gel-like material is filled into the meat-containing raw material, so that the gel-like material cannot come out to the surface of the meat-containing raw material. In addition, the gel-like material is filled into the meat-containing raw material, so that it can be localized in a plurality of predetermined positions inside the meat-containing raw material, and preferably, such a plurality of predetermined positions are substantially uniformly distributed in the meat-containing raw material. In the present invention, the terms "localize" and "locally" are used to mean a state in which the gel-like material is concentrated in target positions (a plurality of predetermined positions) inside the meat-containing raw material. Thus, it is desirable to prevent a state in which the gel-like material is non-uniformly dispersed or spotted in the entire portion inside the meat-containing raw material, or a state in which the gel-like material is biasedly distributed only in the center or only in the peripheral portion. The position or number of the predetermined positions, in each of which the gel-like material is localized, cannot be univocally determined depending on the type or size of the meat processed product, but the position or number of the predetermined positions can be determined, as appropriate, depending on desired food texture (the degree of juicy texture).

Moreover, in the present invention, the gel-like material is quantitatively filled into the meat-containing raw material. The term "quantitatively" is used in the present invention to mean that the amount of the gel-like material to be filled is substantially constant per position. The amounts of the gel-like materials to be filled into individual positions may be equal to one another, or may also be increased or decreased to a certain extent.

Hence, the gel-like material is locally and quantitatively filled into a plurality of predetermined positions inside the meat-containing raw material, so that the obtained meat processed product can provide sufficient and varied juicy texture, upon eating.

As described above, the meat-containing raw material filled with the gel-like material is cooked by an ordinary method before eating. Herein, the cooking includes cooking with a heat treatment, such as baking, deep frying, steaming, or boiling. Individual conditions such as a heating temperature and a heating time may be adjusted, as appropriate, depending on the types of raw materials such as a meat, a heating method, and the like. The heating temperature is generally 70° C. to 200° C., and the heating time is generally 30 seconds to 2 hours.

After completion of the cooking, the obtained meat processed food may be frozen. In the production method of the present invention, when the meat processed food is frozen, freezing conditions (e.g., a freezing temperature, etc.) may be adjusted, as appropriate. The meat processed food is preferably quickly frozen at a temperature of −30° C. or lower. Thereafter, the meat processed food is preserved as a frozen food at a temperature of generally −10° C. or lower, and preferably −15° C. or lower. The method of thawing the thus obtained frozen food is not particularly limited, and the frozen food may be thawed according to a thawing method known in the field of frozen foods (e.g., microwave heating, oven heating, superheated steam heating, frying pan baking, boiling, natural thawing, etc.).

EXAMPLES

Hereinafter, the present invention will be further specifically described in the following examples and comparative examples. However, these examples are not intended to limit the scope of the present invention.

In each of the following tables, the product name "Phosphate NO. 3" (manufactured by Daiichi Kasei Co., Ltd.) was used as a phosphate; the product name "Pure Nutmeg Powder SA" (manufactured by Kanekasunspice Corporation) was used as a spice (nutmeg); the product name "Black Pepper Powder S60" (manufactured by Kanekasunspice Corporation) was used as a spice (black pepper); the product name "Stabilose 1000" (manufactured by Matsutani Chemical Industry Co., Ltd.) was used as a starch; the product name "Apex 650" (manufactured by FUJI OIL CO., LTD.) was used as a vegetable protein; the product name "Kyouei Roasted White Raw Bread Crumbs 6M" (manufactured by KYOUEISHOKUHIN Corporation) was used as raw bread crumbs; a deacylation type gellan gum formulation, namely, the product name "Gel UP K-S" (manufactured by San-Ei Gen F. F. I., Inc.) was used as gellan gum; the product name "Gelatin APH100" (manufactured by Nitta Gelatin, Inc.) was used as gelatin; the product name "Calcium Lactate" (manufactured by Taihei Chemical Industrial Co., Ltd.) was used as calcium lactate; the product name "Curdlan" (manufactured by MC Food Specialties Inc.) was used as curdlan; and the product name "Karikorikan" (manufactured by Ina Food Industry Co., Ltd.) was used as agar.

(Test Example 1) Production of Gel-Like Material and Studies Regarding Method of Filling Gel-Like Material Into Hamburger Steak (Examples 1 to 4 and Comparative Examples 1 to 5)

(1) Production of Patty

The raw materials were mixed with one another according to the formulation shown in Table 1 to produce a patty. The raw materials were mixed with one another by the following procedures. First, a beef minced meat, a pork minced meat, and common salt and phosphate dissolved in water were placed in KENMIX (Stand Mixer; model number: KMM77), and the obtained mixture was then kneaded for 5 minutes. Thereafter, spices and starch were added to the resulting mixture, followed by blending them. Thereafter, egg, sodium glutamate, vegetable protein immersed in water, and raw onion were added to the mixture. Finally, raw bread crumbs were added to the mixture, and the thus obtained mixture was then blended to obtain a patty.

TABLE 1

| Patty Formulation | | |
|---|---|---|
| Raw Material | Mixed Amount (wt %) | Mixed Amount (kg) |
| Beef minced meat (3 mm) | 23.41 | 200.00 |
| Pork minced meat (3 mm) | 23.41 | 200.00 |
| Water | 15.23 | 130.00 |
| Common salt | 0.76 | 6.50 |
| Phosphate | 0.06 | 0.50 |
| Spices (black pepper, nutmeg) | 0.03 | 0.25 |
| Starch | 1.17 | 10.00 |

TABLE 1-continued

Patty Formulation

| Raw Material | Mixed Amount (wt %) | Mixed Amount (kg) |
|---|---|---|
| Egg | 2.93 | 25.00 |
| Sodium glutamate | 0.23 | 2.00 |
| Vegetable protein | 3.51 | 30.00 |
| Raw onion (4.5 mm dices) | 23.41 | 200.00 |
| Raw bread crumbs | 5.85 | 50.00 |
| Total | 100.00 | 854.25 |

(2) Production of Gel-Like Material
(2-1) Production of Gel A (Deacylation Type Gellan Gum/Gelatin/Calcium Lactate)

Deacylation type gellan gum, gelatin, and caster sugar were added to water according to the gel formulation A (% by weight) shown in Table 2, and were then mixed with one another. The obtained mixture was heated to 85° C. to prepare a gelling agent solution. Into this gelling agent solution, calcium lactate was added and mixed, and thereafter, the obtained mixture was then cooled to 20° C., while stirring with a whipper, so as to obtain Gel A.

Deacylation type gellan gum, gelatin, and caster sugar were added to water according to the gel formulation A (% by weight) shown in Table 2, and were then mixed with one another. The obtained mixture was heated to 85° C. to prepare a gelling agent solution. Into this gelling agent solution, calcium lactate was added and mixed, and thereafter, the obtained mixture was cooled to 20° C. by being left at rest. The resulting mixture was crushed using a juicer mixer (Russell Hobbs Power Blender 14072P), so as to obtain Gel A (crushed).

TABLE 2

Gel Formulation A

| Raw Material | Mixed Amount (wt %) |
|---|---|
| Water | 96.10 |
| Gellan gum | 1.00 |
| Gelatin | 0.70 |
| Caster sugar | 2.00 |
| Calcium lactate | 0.20 |
| Total | 100.00 |

(2-2) Production of Gel B (Deacylation Type Gellan Gum/Gelatin/Calcium Lactate)

Deacylation type gellan gum, gelatin, and caster sugar were added to water according to the gel formulation B (% by weight) shown in Table 3, and were then mixed with one another. The obtained mixture was heated to 85° C. to prepare a gelling agent solution. Into this gelling agent solution, calcium lactate was added and mixed, and thereafter, the obtained mixture was cooled to approximately 20° C. by being left at rest, so as to obtain Gel B.

TABLE 3

Gel Formulation B

| Raw Material | Mixed Amount (wt %) |
|---|---|
| Water | 92.70 |
| Gellan gum | 0.20 |
| Gelatin | 5.00 |

TABLE 3-continued

Gel Formulation B

| Raw Material | Mixed Amount (wt %) |
|---|---|
| Caster sugar | 2.00 |
| Calcium lactate | 0.10 |
| Total | 100.00 |

(2-3) Production of Gel C (Curdlan/Gellan Gum/Calcium Lactate)

Curdlan, gellan gum, caster sugar, and calcium lactate were added to water according to the gel formulation C (% by weight) shown in Table 4, and were then mixed with one another to obtain Gel C-1. At the same time, curdlan, gellan gum, caster sugar, and calcium lactate were added to water according to the gel formulation C (% by weight) shown in Table 4, and were then mixed with one another, and thereafter, the obtained mixture was heated to 85° C. Thereafter, the reaction mixture was cooled to approximately 20° C. by being left at rest, so as to obtain Gel C-2.

TABLE 4

Gel Formulation C

| Raw Material | Mixed Amount (wt %) |
|---|---|
| Water | 92.80 |
| Gellan gum | 1.00 |
| Caster sugar | 1.90 |
| Calcium lactate | 0.40 |
| Curdlan | 3.90 |
| Total | 100.00 |

(2-4) Production of Gel D (Deacylation Type Gellan Gum/Calcium Lactate)

Deacylation type gellan gum and caster sugar were added to water according to the gel formulation D (% by weight) shown in Table 5, and were then mixed with one another. The obtained mixture was heated to 85° C. to prepare a gelling agent solution. Into this gelling agent solution, calcium lactate was added and mixed, and thereafter, the obtained mixture was then cooled to 20° C., while stirring with a whipper, so as to obtain Gel D.

TABLE 5

Gel Formulation D

| Raw Material | Mixed Amount (wt %) |
|---|---|
| Water | 96.80 |
| Gellan gum | 1.00 |
| Caster sugar | 2.00 |
| Calcium lactate | 0.20 |
| Total | 100.00 |

(2-5) Production of Gel E (Agar/Gelatin)

Agar, gelatin, and caster sugar were added to water according to the gel formulation E (% by weight) shown in Table 6, and were then mixed with one another. The obtained mixture was heated to 85° C. to prepare a gelling agent solution. This gelling agent solution was cooled to approximately 20° C., while stirring with a whipper, so as to obtain Gel E.

TABLE 6

Gel Formulation E

| Raw Material | Mixed Amount (wt %) |
|---|---|
| Water | 96.80 |
| Agar | 0.50 |
| Gelatin | 0.70 |
| Caster sugar | 2.00 |
| Total | 100.00 |

(3) Filling of Gel Into Patty (3-1) Preparation of Test Samples Using Gel A (Examples 1 and 2)

The patty produced in (1) above (hereinafter simply referred to as "patty") was molded into an elliptical shape (114 g/patty). Thereafter, Gel A and Gel A (crushed) produced in (2-1) above were each placed into a syringe (50-ml Termo Syringe, SlipChip White, SS-50ESZ), and were then injected in an amount of 1 g each into 6 sites inside the molded patty, so as to prepare hamburger steaks (Examples 1 and 2) as test samples (120 g/sample).

(3-2) Preparation of Test Sample Using Gel D (Example 3)

The patty was molded into an elliptical shape (114 g/patty). Thereafter, Gel D produced in (2-4) above was placed into a syringe (50-ml Termo Syringe, SlipChip White, SS-50ESZ), and was then injected in an amount of 1 g each into 6 sites inside the molded patty, so as to prepare a hamburger steak (Example 3) as a test sample (120 g/sample).

(3-3) Preparation of Test Sample Using Gel E (Example 4)

The patty was molded into an elliptical shape (114 g/patty). Thereafter, Gel E produced in (2-5) above was placed into a syringe (50-ml Termo Syringe, SlipChip White, SS-50ESZ), and was then injected in an amount of 1 g each into 6 sites inside the molded patty, so as to prepare a hamburger steak (Example 4) as a test sample (120 g/sample).

(3-4) Preparation of Test Sample Without Using Gel (Comparative Example 1)

The patty was molded into an elliptical shape (120 g/patty), so that a hamburger steak (Comparative Example 1, blank) was prepared as a test sample, into which no gel was filled.

(3-5) Preparation of Test Samples Using Gel B (Comparative Examples 2 and 3)

Gel B produced in (2-2) above was minced to a size of 3 mm using a chopper, and was then mixed into the patty, so that the amount of the gel became 5% by weight in the patty. The obtained mixture was molded into an elliptical shape (120 g/patty), so as to prepare a hamburger steak (Comparative Example 2) as a test sample.

The patty was molded into an elliptical shape (114 g/patty). Thereafter, Gel B produced in (2-2) above was cut into a dice-like shape (1 g/dice). The thus prepared 6 dice gels were injected into the molded patty and onto the surface thereof (i.e., the dice gels were exposed on the surface), so as to prepare a hamburger steak (Comparative Example 3) as a test sample (120 g/sample).

(3-6) Preparation of Test Samples Using Gel C (Comparative Examples 4 and 5)

The patty was molded into an elliptical shape (114 g/patty). Thereafter, Gel C-1 and Gel C-2 produced in (2-3) above were each placed into a syringe (50-ml Termo Syringe, SlipChip White, SS-50ESZ), and were then injected in an amount of 1 g each into 6 sites inside the molded patty, so as to prepare hamburger steaks (Comparative Example 4 and Comparative Example 5) as test samples (120 g/sample).

(4) Evaluation of Physical Properties of Gel-Like Materials and Methods of Filling Gel-Like Materials Into Hamburger Steaks With regard to the hamburger steaks used as individual test samples, formulation of gel used in filling, the physical properties of the gel, the method for producing a gel-like material, the method of filling a gel-like material into patty, and the state of a gel-like material in a hamburger steak are summarized in Table 7.

TABLE 7

| Test Group | Method for producing gel-like material | Gel formulation | Gel properties | Method of filling into patty | State of gel-like material in hamburger steak |
|---|---|---|---|---|---|
| Ex. 1 | Mixing→heating→ cooling while stirring | A | Fluidic | Injecting into patty | Localized in pre-determined sites inside patty |
| Ex. 2 | Mixing→heating→ static cooling, then crushing | A | Fluidic | Injecting into patty | Localized in pre-determined sites inside patty |
| Ex. 3 | Mixing→heating→ cooling while stirring | D | Fluidic | Injecting into patty | Localized in pre-determined sites inside patty |
| Ex. 4 | Mixing→heating→ cooling while stirring | E | Fluidic | Injecting into patty | Localized in pre-determined sites inside patty |
| Comp. Ex. 1 (blank) | Without using gel | — | — | — | — |
| Comp. Ex. 2 | Mixing→heating→ static cooling | B | Solid | After mincing, mixing into patty followed by molding | Entirely dispersed in patty |
| Comp. Ex. 3 | Mixing→heating→ static cooling | B | Solid | After cutting into dices, injecting into patty and onto surface thereof | Gel is exposed on surface of patty, resulting in unnatural appearance |
| Comp. Ex. 4 | Only mixing (without heating) | C-1 | Liquid | Injecting into patty | Gel is not localized in predetermined sites but is soaked in patty |

TABLE 7-continued

| Test Group | Method for producing gel-like material | Gel formulation | Gel properties | Method of filling into patty | State of gel-like material in hamburger steak |
|---|---|---|---|---|---|
| Comp. Ex. 5 | Mixing→heating→cooling | C-2 | Solid | Gel does not become fluidic; not injectable | Gel does not become fluidic; not injectable |

As shown in Table 7, Gels A, D, and E comprising deacylation type gellan gum or agar as a main gel were fluidic and could be injected into the patty, so that these gels could be localized in predetermined sites in the patty. In the case of Gel B, since the amount of gelatin used as a gelation auxiliary component was large, the gel was converted to a solid, and thus, it could not be localized in the form of a fluidic gel in predetermined sites in the patty. Gel C-1 comprising curdlan as a main gel was a liquid and could be injected into the patty. However, Gel C-1 was soaked in the patty and thus, could not be localized in predetermined sites. Gel C-2 also comprising curdlan as a main gel was converted to a solid, and it did not have fluidity and could not be injected into the patty.

(Test Example 2) Sensory Evaluation

The oil was poured into an iron plate at 230° C. The hamburger steaks that were prepared as test samples in Test Example 1 were placed on the iron plate, and both sides of each hamburger steak were then baked for each 1 minute. Thereafter, the hamburger steaks were cooked with steam at 100° C. for 8 minutes, and were then frozen in a freezer at about −35° C. Subsequently, the frozen hamburger steaks with about −18° C. were arranged on a baking board, and were then heated in a convection oven at 180° C. for 14 minutes, so as to prepare samples for eating.

The prepared samples were subjected to sensory evaluation to evaluate the "juicy texture" felt upon eating. The sensory evaluation was carried out with 4 professional panelists, and the evaluation was scored with points ranging from −2 (without juicy texture) to +2 (with juicy texture) in accordance with the following evaluation criteria. Then, a mean value was calculated.

<Evaluation Criteria of Juicy Texture>
 −2.0: Completely no juicy texture
 −1.0: Almost no juicy texture
 0: Yes or no
 1.0: Slight juicy texture
 2.0: High juicy texture The results of the sensory test are shown in Table 8.

TABLE 8

| Test Group | Evaluation of juicy texture (point) | Remarks |
|---|---|---|
| Example 1 | 2.0 | Extremely high juicy texture was felt. |
| Example 2 | 2.0 | Extremely high juicy texture was felt. |
| Example 3 | 1.5 | Extremely high juicy texture was felt. |
| Example 4 | 1.0 | Juicy texture was slightly felt. |
| Comp. Example 1 | −2.0 | No juicy texture was felt. |
| Comp. Example 2 | 0 | Overall softness was felt. |
| Comp. Example 3 | — | Gel was exposed on patty surface, resulting in unnatural appearance. |
| Comp. Example 4 | −2.0 | No juicy texture was felt. |
| Comp. Example 5 | — | — |

As shown in Table 8, the hamburger steaks of Examples 1 to 4, in which fluidic gels (Gels A, D, and E) were each located in a plurality of predetermined positions inside the patty, had juicy texture. In contrast, the hamburger steak of Comparative Example 2, in which solid gel (Gel B) was entirely dispersed in the patty, was entirely soft, without having juicy texture. In the case of the hamburger steak of Comparative Example 3, in which the solid gel was injected into the patty and onto the surface thereof, the gel was exposed to the surface, resulting in poor appearance. Moreover, the hamburger steak of Comparative Example 4, in which Gel C-1 (liquid) comprising curdlan as a main gel was used, had completely no juicy texture. Likewise, in the case of the Gel C-2 (solid) comprising curdlan as a main gel, injection of the gel was impossible.

(Test Example 3) Measurement of Viscosity of Gel-Like Material and Evaluation of Filling Suitability Using Viscosity Gel-like materials were produced according to the method for producing Gel A in Test Example 1 (Test No. 1 to No. 6), with the exception that the mixing amounts (% by weight) of gellan gum and calcium lactate in the gel formulation A shown in the above Table 2 were changed as shown in the following Table 9.

The viscosity of each of the produced gel-like materials was measured. Each gel-like material (200 g) was poured into a 200-ml beaker, and the viscosity thereof was then measured using the viscometer TVC-7 manufactured by Toki Sangyo Co., Ltd. A suitable rotor was selected depending on the viscosity, and the value obtained 30 seconds after initiation of the measurement was adopted as a measurement value.

Thereafter, the patty was molded into an elliptical shape (114 g/patty). The above-described gel-like materials (Test No. 1 to No. 6) were each placed in a syringe (50-ml Termo Syringe, SlipChip White, SS-50ESZ), and were then injected in an amount of 1 g each into 6 sites inside the molded patty. Thereafter, filling suitability was evaluated in accordance with the following criteria.

<Evaluation Criteria of Filling Suitability>
 ⊚: The gel-like material is easily injected using a syringe, and can be filled into predetermined sites.
 ◯: The gel-like material has viscosity enough to be injected using a syringe, and can be filled into predetermined sites.
 x: The gel-like material cannot be injected using a syringe.

The measurement results of viscosity and the evaluation results of filling suitability are shown in Table 9.

TABLE 9

| | \<Test Sample\> | | | | | |
|---|---|---|---|---|---|---|
| | No. 1 | No. 2 | No. 3 (Example 1) | No. 4 (Example 2) | No. 5 | No. 6 |
| Gellan gum (wt %) | 0.20 | 0.50 | 1.00 | 1.00 | 2.00 | 3.00 |
| Calcium lactate (wt %) | 0.04 | 0.10 | 0.20 | 0.20 | 0.40 | 0.60 |
| Gel production method | Heating→ stirring cooling | Heating→ stirring cooling | Heating→ stirring coding | Heating→ static cooling→ crushing | Heating→ static cooling→ crushing | Heating→ static cooling→ crushing |
| \<Viscosity Measurement\> | | | | | | |
| Measurement value (Pa · s) | 0.61 | 1.11 | 3.44 | 8.24 | 16.3 | 49.1 |
| Rotor | No. 2 | No. 3 | No. 3 | No. 3 | No. 4 | No. 5 |
| Temperature (° C.) | 23.0 | 28.0 | 16.8 | 13.5 | 13.5 | 15.8 |
| \<Filling Suitability\> | X | ○ | ⊚ | ⊚ | ○ | X |
| Remarks | Leaked out due to low viscosity. Soaked into patty. | Slightly low viscosity, but fillable | Fillable | Fillable | Slightly high viscosity, but fillable | High viscosity, impossible to be filled |

As shown in Table 9, when the gel-like materials had a viscosity that was within the range of 1.0 to 17.0 Pa·s (test sample Nos. 2, 3, 4, and 5), the test samples had filling suitability. Moreover, when deacylation type gellan gum was used, the appropriate concentration of the gelling agent was 0.21% to 0.84% by weight (calculated in terms of 42% of the used preparation "Gel UP K-S").

[Food (a Meat Processed Food) Manufacturing System]

Figure 2:
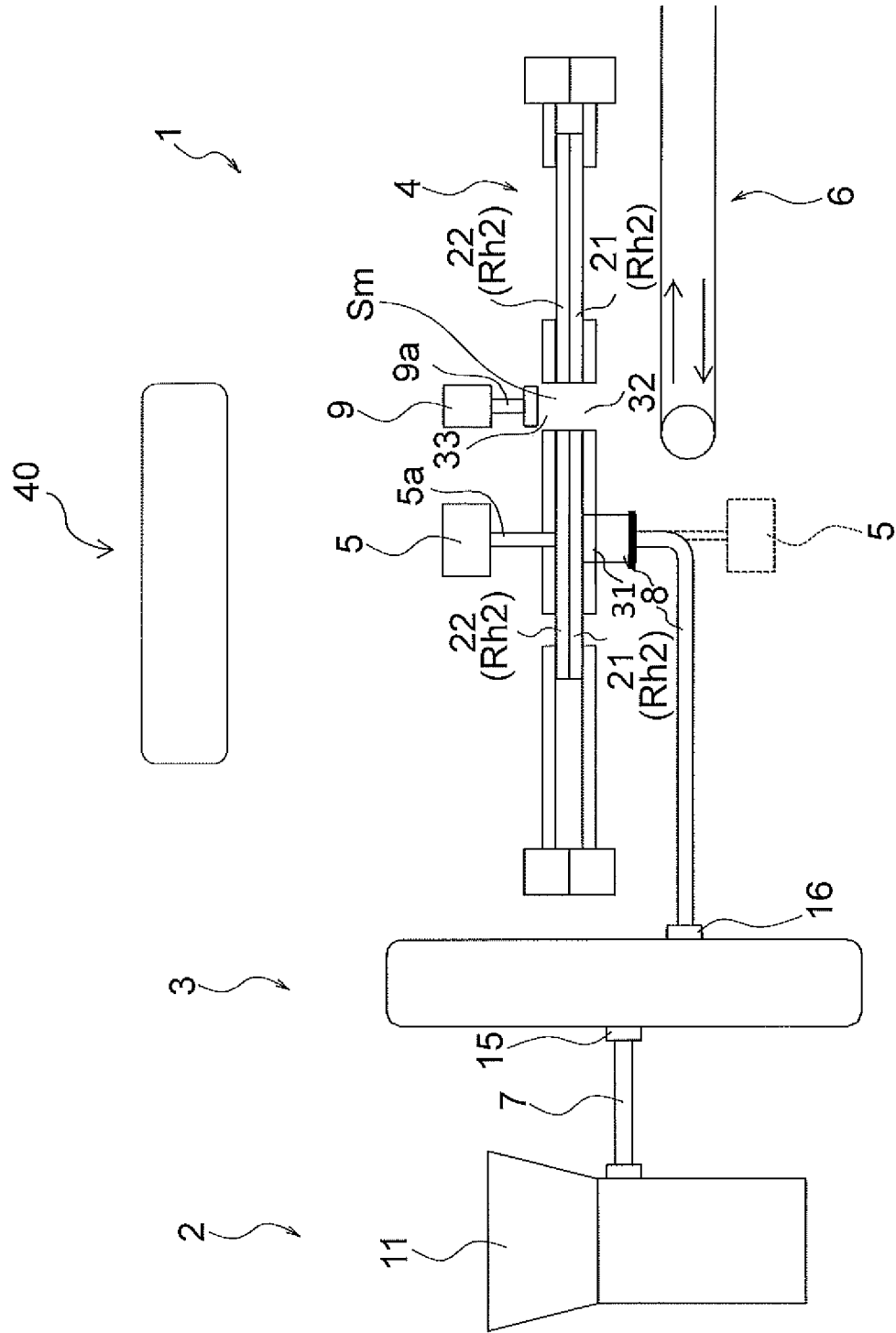
FIG. 2 is a diagram showing an overall configuration of an example of the food (a meat processed food) manufacturing system, and shows a state in which a first molding die and a second molding die are disposed at the second horizontal position.

FIG. 1 is a diagram showing an overall configuration of an example of a food manufacturing system, and shows a state in which a first molding die and a second molding die are disposed at a first horizontal position. FIG. 2 is a diagram showing an overall configuration of an example of the food manufacturing system, and shows a state in which the first molding die and the second molding die are disposed at the second horizontal position.

The food production system 1 shown in FIGS. 1 and 2 comprises a supply device 2, a delivery device 3, a separating device 4, an introducing device 5 and a conveying device 6.

The supply device 2 is connected to a first port 15 of the delivery device 3 via a first relay guide 7. The illustrated supply device 2 includes a hopper 11. The meat-containing raw material is supplied to the supply device 2 by manually or mechanically introducing the food into the hopper 11. The supply device 2 may comprise a vane pump, a piston pump, a screw pump, or other pump to deliver the meat-containing raw material to the delivery device 3 via the first relay guide 7. Specific configurations of vane pumps, piston pumps, screw pumps and other pumps that the supply device 2 may comprise are not limited and may have any configuration.

The supply device 2 sends the meat-containing material to the delivery device 3 via the first relay guide 7. The supply device 2 sends the meat-containing raw material to the first relay guide 7 and the delivery device 3 (in particular, the first port 15), while adding the pressure to the meat-containing raw material with greater than the air pressure in the environment in which the food manufacturing system 1 (in particular, supply device 2 and delivery device 3) (usually atmospheric pressure) is surrounded. For example, the pressure is about 0.05 MPa-1.0 MPa (gauge pressure), preferably, 0.1 MPa-0.8 MPa, more preferably, 0.2 MPa-0.6 Mpa pressure (first gauge pressure). Herein, the gauge pressure referred to in this specification means a difference between the absolute pressure and the air pressure of the environment in which the food manufacturing system 1 is placed, that is, the environmental pressure.

The delivery device 3 has a first port 15 and a second port 16. The first port 15 is connected to the supply device 2 via the first relay guide 7, the second port 16 is connected to a filling hole 31 of the separation device 4 via a second relay guide 8. The delivery device 3 delivers a predetermined amount of meat-containing raw material which is supplied from the supply device 2 via the first port 15 to the separation device 4 via the second port 16. The meat-containing raw material delivered from the second port 16 is passed through the second relay guide 8 to the separation device 4. That is, the meat-containing raw material filled in the second relay guide 8 is pushed by the meat-containing raw material newly delivered from the delivery device 3 to the second relay guide 8, and the meat-containing raw material pushed out from the second relay guide 8 is supplied to the separation device 4. Typically, the amount of the meat-containing raw material supplied from the second relay guide 8 to the separation device 4 can be consistent with the amount of the meat-containing raw material delivered from the second port 16 to the second relay guide 8. In this case, the amount of the meat-containing raw material delivered from the delivery device 3 at a time is determined according to the amount of the meat-containing raw material to be supplied to the separation device 4 at a time. However, the total amount of the meat-containing raw material to be supplied to the separation device 4 (e.g., a molding space Sm (to be described later)) is not necessarily required to be consistent with the amount of the meat-containing raw material to be delivered from the delivery device 3 to the second relay guide 8 per one time. The total amount of the meat-containing raw material supplied to the separation device 4 with plural times by feeding the meat-containing raw material from the delivery device 3 to the second relay guide 8 with plural times may correspond to the total amount of the meat-containing raw material to be supplied in one process in an accommodation space of the separation device 4 (for example, the molding space Sm described later).

The pressure acting on the meat-containing raw material supplied to the delivery device 3 basically does not affect the pressure acting on the meat-containing raw material delivered from the delivery device 3. In this embodiment, a pressure (second gauge pressure), which is lower than the pressure (the first gauge pressure) acting on the meat-containing raw material supplied from the first relay guide 7 to the delivery device 3, acts on the meat-containing raw material supplied from the first relay guide 7 to the delivery device 3. The second gauge pressure is, for example, the degree equivalent to the environmental pressure acting on the meat-containing raw material. That is, the pressure (absolute pressure) required to be applied to the meat-containing raw material to be delivered from the delivery device 3 to the separation device 4 may be somewhat higher than the environmental pressure. It is possible to deliver the meat-containing raw material from the delivery device 3 to the separation device 4 via the second relay guide 8 by a relatively low pressure (gauge pressure) of, for example, 0.01 MPa to 0.01 MPa. This is because the molding space Sm to be described later (separation device 4) has the environmental pressure in communication with the outside, and the filling hole 31, the second relay guide 8 and the second port 16 are connected to the molding space Sm. As a result, it is possible to effectively prevent the density of the meat-containing raw material in the second relay guide 8 and the separation device 4 excessively increases, and it is possible to supply the meat-containing raw material having an appropriate density to the separation device 4. In the separation device 4, a portion (the molding space Sm) to which the filling hole 31, the second relay guide 8 and the second port 16 are connected, may have a pressure below the environmental pressure, for example, it may have a negative pressure.

[Food (a Meat Processed Food) Production Method]

Figure 3:
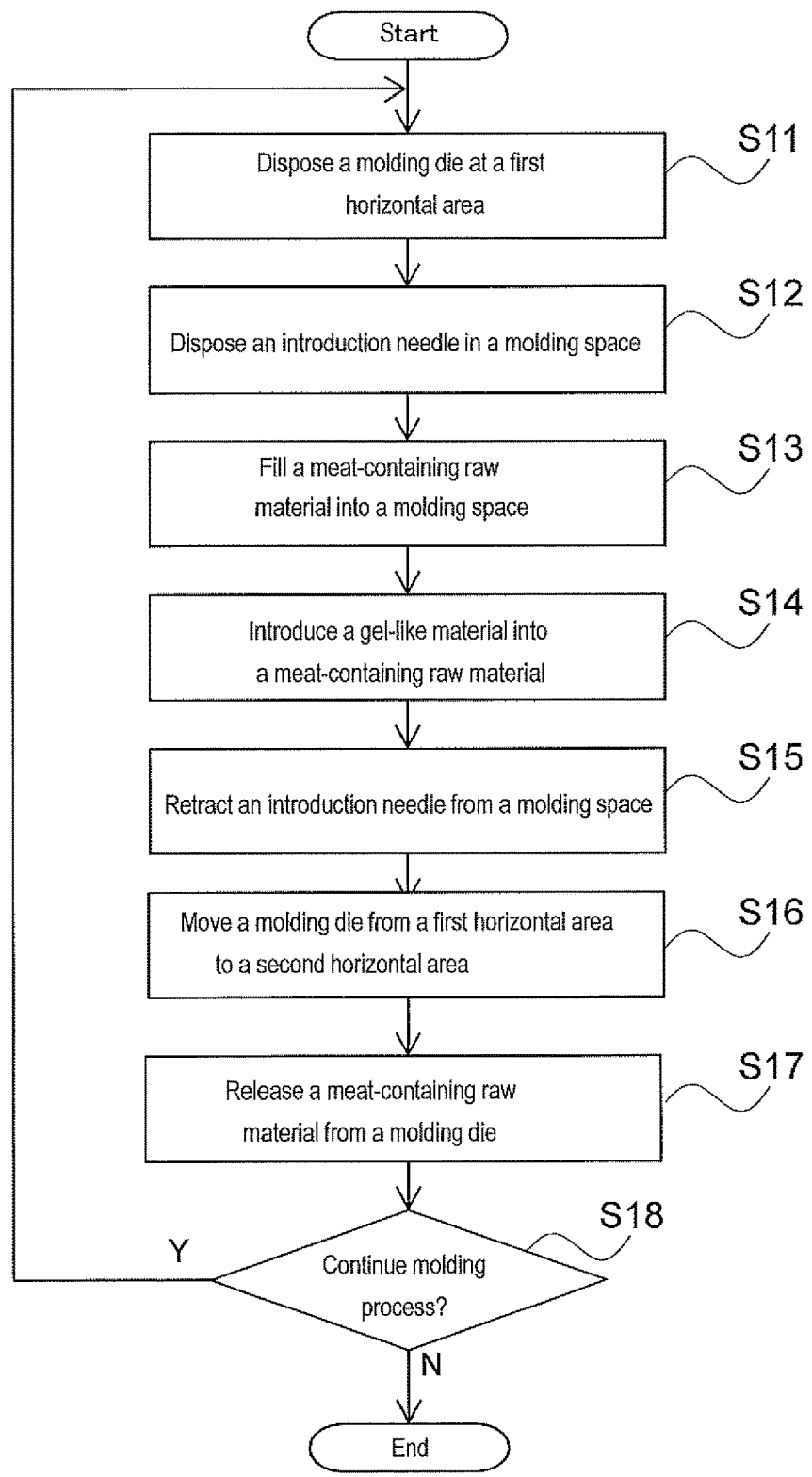
FIG. 3 is a flowchart illustrating an example of a food (a meat processed food) manufacturing method (food molding process) performed by the food manufacturing system shown in FIGS. 1 and 2.

FIG. 3 is a flowchart illustrating an example of a food manufacturing method (food molding process) performed by the food manufacturing system 1 shown in FIGS. 1 and 2. Each of the processes described below is performed by driving each device constituting the food manufacturing system 1 under the control of a control unit 40.

As described above, the food manufacturing method of the present embodiment comprises a step of delivering a meat-containing raw material from the delivery device 3, a step of separating and molding the meat-containing raw material after being delivered from the delivery device 3 by the separation device 4, and a step of introducing a gel-like material into the inside of the meat-containing raw material after being delivered from the delivery device 3 by the introducing device 5.

First, the delivery device 3 supplies the meat-containing raw material to the second relay guide 8, resulting in a state that the second relay guide 8 and the filling hole 31 are filled with the meat-containing raw material. Here, the state where the second relay guide 8 and the filling hole 31 is filled with the meat-containing raw material, not necessarily refers to a state where no gap exists between the second relay guide 8 and the filling hole 31 in a strict sense. In particular, when the introduction of an injection substance (a gel-like material) in the introducing device 5 into the meat-containing raw material is performed at the second relay guide 8 and/or the filling hole 31, the second relay guide 8 and the filling hole 31 may be filled with the meat-containing raw material in a state that a gap corresponding to the introduction space for the injection substance exists in the second relay guide 8 and/or the filling hole 31. The supply device 2 continues to supply the meat-containing raw material to the delivery device 3 via the first relay guide 7. The supply device 2 may continue to apply pressure to the meat-containing raw material in the first relay guide 7 continuously regardless of the operating state of the delivery device 3 during the food manufacturing system 1 is operated, or may apply pressure to the meat-containing raw material in the first relay guide 7 intermittently depending on the operating state of the delivery device 3.

Then, the separating device 4 is driven, and a molding die 21 and a molding die 22 are disposed in the first horizontal area Rh1, so that the molding space Sm defined by the molding dies 21 and 22 is placed in communication with the filling hole 31 (S11 in FIG. 3).

The introducing device 5 is driven, an introduction needle 5a of the introducing device 5 is disposed in the molded space Sm (S12 in FIG. 3). At this time, the introduction needle 5a (particularly a portion for discharging a gel-like material) is disposed at a desired position of the molding space Sm so that the gel-like material discharged from the introduction needle 5a can be introduced and arranged at a desired position of the meat-containing raw material to be filled in the molding space Sm.

Then, the delivery device 3 is driven, a predetermined amount of the meat-containing raw material is delivered from the second port 16 of the delivery device 3 to the second relay guide 8, the meat-containing raw material inside the second relay guide 8 and inside the filling hole 31 is extruded, as a result, the meat-containing raw material is filled in the molding space Sm (S13 in FIG. 3). At this time, the amount of the meat-containing raw material to be delivered from the delivery device 3 is determined so that the meat-containing raw material to be filled in the molding space Sm has a desired density. In this embodiment, since the meat-containing raw material is filled in the molding space Sm in a state in which the distal end portion of the introduction needle 5a is located in the molding space Sm, the introduction needle 5a is inserted from the beginning into the meat-containing raw material filled in the molding space Sm.

After the meat-containing raw material is filled in the molding space Sm, the introducing device 5 is driven, and the gel-like material is introduced into the inside of the meat-containing raw material via the introduction needle 5a (S14 in FIG. 3). Thus, the gel-like material is disposed at a desired position of the meat-containing raw material in the molding space Sm. After the gel-like material is introduced into the meat-containing raw material, the introducing device 5 is driven, and the introduction needles 5a are retracted from the molding space Sm (S15 in FIG. 3).

After the introduction needles 5a are retracted from the molding space Sm, the separating device 4 is driven to move the molding dies 21 and 22 from the first horizontal area Rh1 to the second horizontal area Rh2 in step S16. As a result, the molding space Sm is placed in communication with a release hole 32 and a punching hole 33.

Then, a punching device 9 is driven while the molding dies 21 and 22 are disposed in the second horizontal area Rh2, and the meat-containing raw material in the molding space Sm are released from the molding dies 21 and 22 by a punching rods 9a in step S17. The meat-containing raw material after molding released from the molding dies 21 and 22 is placed on a conveying device 6 and sent to a later stage.

Then, control unit 40 judges whether or not the molding process of the meat-containing raw material is continued (S18 in FIG. 3). When the molding process is continued (Y in S18 in FIG. 3), each device constituting the food manufacturing system 1 is driven, and the above-described steps (S11 to S17 in FIG. 3) are repeated. On the other hand, when the molding process is not continued (N in S18 in FIG. 3), the molding process of the meat-containing raw material ends.

Figure 4:
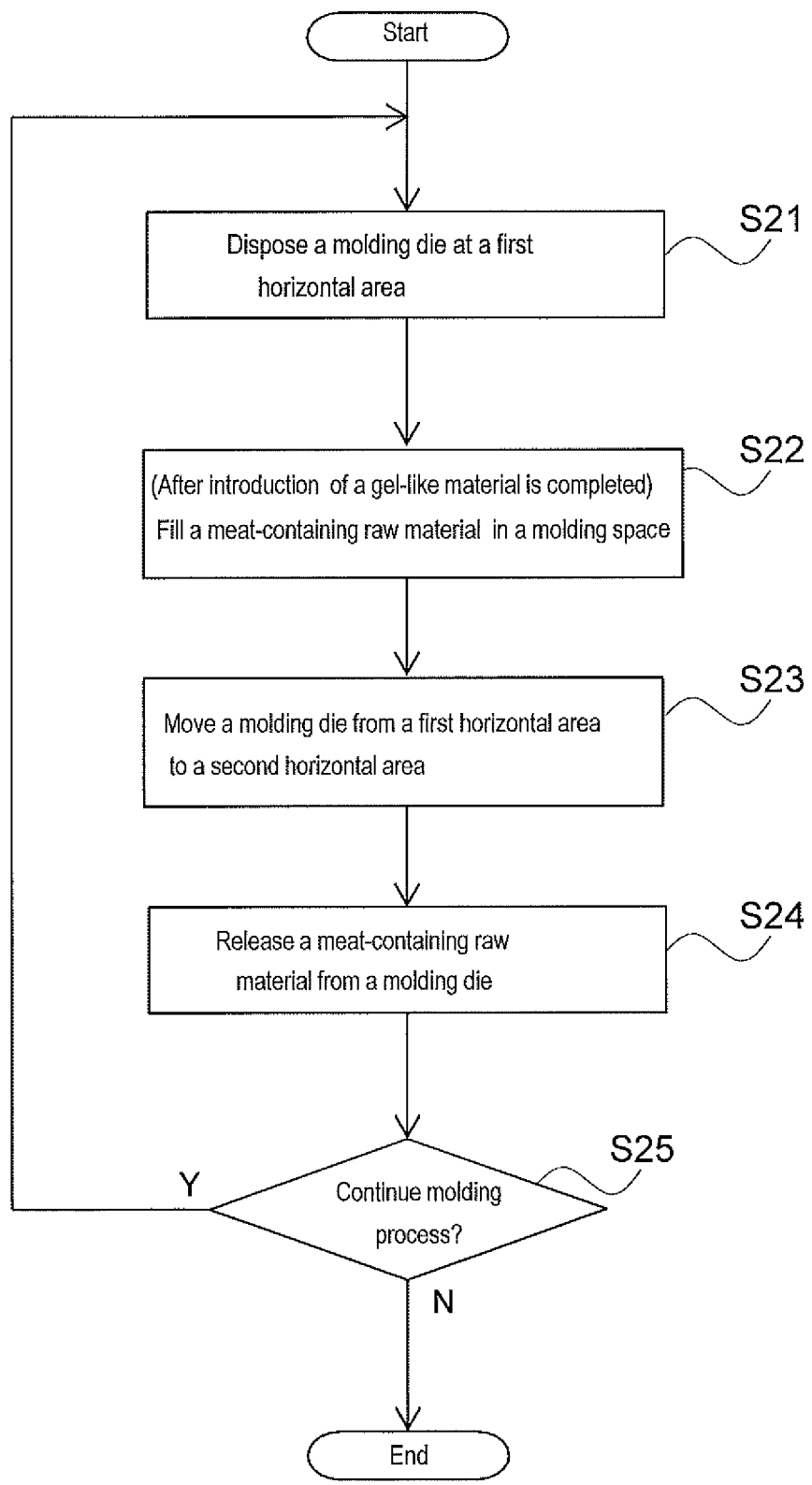
FIG. 4 is a flowchart showing a modification of the food manufacturing method (food molding process).

FIG. 4 is a flow chart illustrating one modification of the food manufacturing method (food molding processing).

In the modification method indicated in FIG. 4, the introducing device 5 may introduce a gel-like material into the inside of the meat-containing raw material at the previous stage of the separation device 4. In this case, the meat-containing raw material after the gel-like material is introduced is filled in the molding space Sm of the molding dies 21 and 22. Therefore, it is possible to perform the step of introducing the gel-like material into the meat-containing raw material in the introducing device 5 in parallel with the step of separating the meat-containing raw material in the separation device 4.

Although illustration is omitted, other devices constituting the food manufacturing system 1, for example, the supply device 2 and the conveyance device 6, may be driven under the control of the control unit 40. For example, when the supply device 2 is controlled by the control unit 40, the supply amount, the supply pressure, and/or the supply timing of the meat-containing raw material from the supply device 2 to the first relay guide 7 may be determined under the control of the control unit 40. When the conveying device 6 is controlled by the control unit 40, the conveyance speed and/or the conveyance timing of the meat-containing raw material placed on the conveying device 6 may be determined under the control of the control unit 40.

Figure 5:
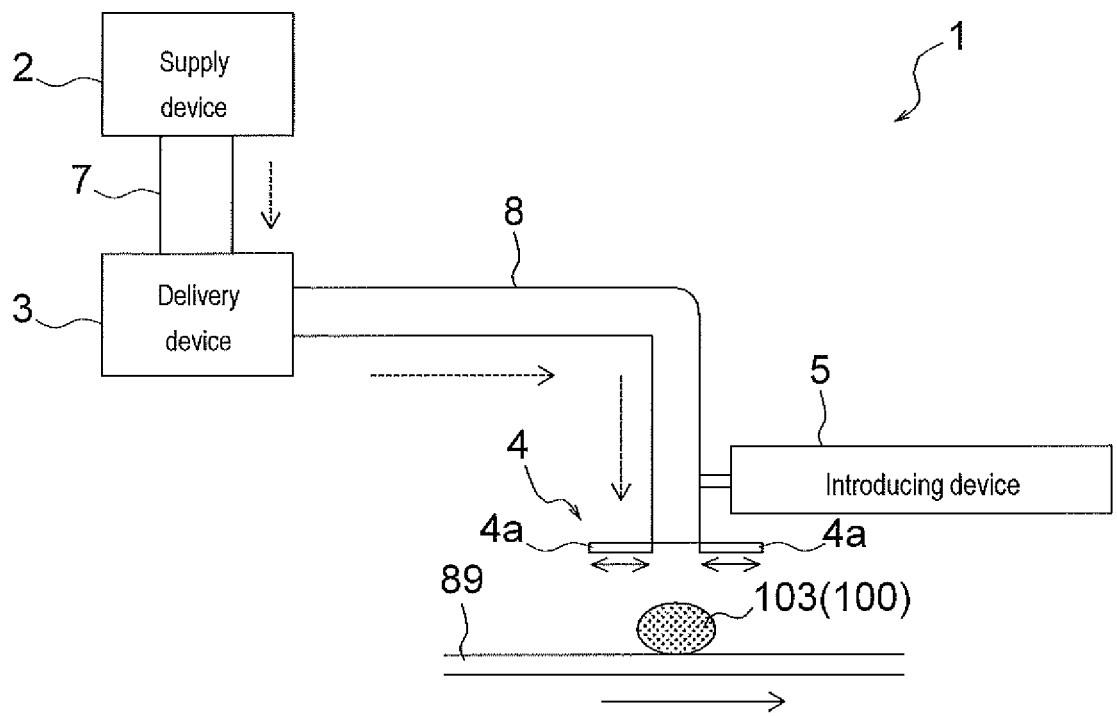
FIG. 5 is a schematic diagram of a food production system for explaining one embodiment of a separation apparatus.

FIG. 5 is a schematic diagram of the food production system 1 for explaining a modification of the separating device 4. The separating device 4 shown in FIG. 5 has a plurality of shutter members 4a that can be opened and closed, and is configured as a cutter for cutting the meat-containing raw material 100. The other components of the food production system 1 shown in FIG. 5 basically have the same configuration and operate in the same manner as the food production system 1 shown in FIG. 1 described above.

In the food production system 1 shown in FIG. 5, the meat-containing raw material 100 is sent from the supply device 2 to the delivery device 3 via the first relay guide 7, and is sent from the delivery device 3 to the second relay guide 8. The introducing device 5 of the present modification introduces the gel-like substance into the meat-containing raw material 100 in the second relay guide 8. The meat-containing raw material 100 is discharged from the second relay guide 8 after the gel-like substance is injected, and is cut by the closing operation of the plurality of shutter members 4a of the separating device 4 provided in the vicinity of the discharge outlet of the second relay guide 8. The meat-containing raw material 100 cut by the shutter member 4a falls and is put on the feed conveyor 89, and is fed to the subsequent stage by the feed conveyor 89 as a separated food material 103.

Figure 6:
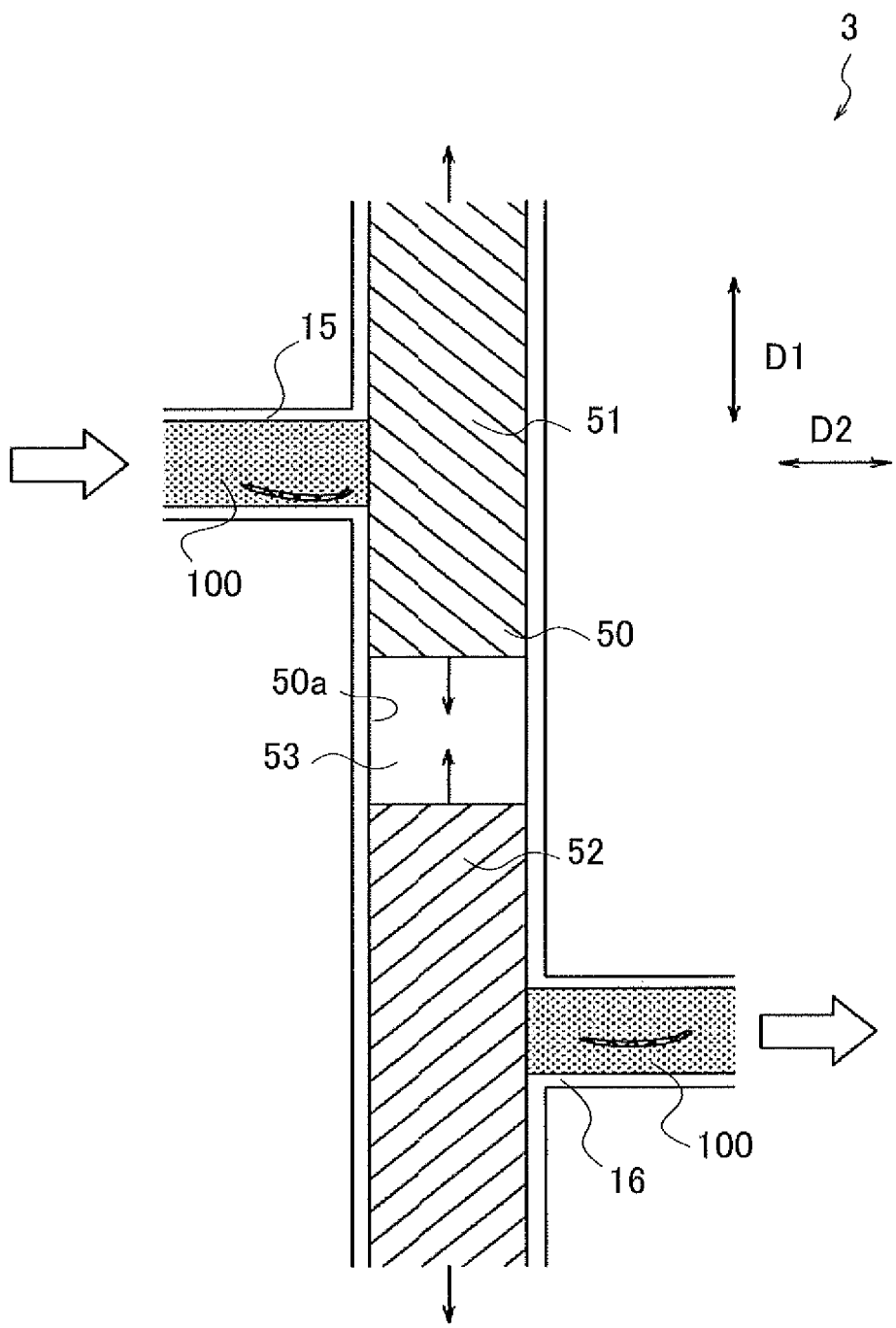
FIG. 6 is a cross-sectional view showing an example of the basic configuration of the delivery device 3.

FIG. 6 is a cross-sectional view showing an example of the basic configuration of the delivery device 3. The delivery device 3 for delivering a predetermined amount of the meat-containing raw material 100 includes a peripheral wall portion 50, a first plunger 51, and a second plunger 52.

The peripheral wall portion 50 has a hollow shape and includes an internal space 53, a first port 15, and a second port 16. The internal space 53 extends in the first direction, i.e., the height direction D1 in the present embodiment shown in FIG. 6. The first port 15 and the second port 16 extend in the second direction, in this embodiment, in the horizontal direction D2 shown in FIG. 6. The first port 15 communicates between the outside (in this embodiment, the first relay guide 7) and the internal space 53. The second port 16 communicates between the outside (the second relay guide 8 in this embodiment) and the internal space 53, and is provided at a position different from the first port 15 with respect to the first direction (height direction D1). The first port 15 functions as an inlet port for introducing the meat-containing raw material 100 into the internal space 53 of the peripheral wall portion 50. The second port 16 functions as an outlet port for releasing the quantitatively divided meat-containing raw material 100 from the internal space 53 of the peripheral wall portion 50.

The first port 15 is connected to the supply device 2 via the first relay guide 7. The meat-containing raw material 100 supplied from the supply device 2 is introduced into the internal space 53 via the first relay guide 7 and the first port 15. The separating device 4 is connected to the second port 16 via the second relay guide 8. The meat-containing raw material 100 in the internal space 53 is delivered to the separating device 4 via the second port 16 and the second relay guide 8.

The first plunger 51 and the second plunger 52 are disposed in the internal space 53 of the peripheral wall portion 50 so as to face each other in the first direction (height direction D1). The first plunger 51 and the second plunger 52 are provided so as to be able to move in the first direction (height direction D1) while being in close contact with an inner wall surface 50a of the peripheral wall portion 50. In this manner, the first plunger 51 and the second plunger 52 have a piston structure provided so as to be reciprocally movable in the internal space 53.

Figure 7:
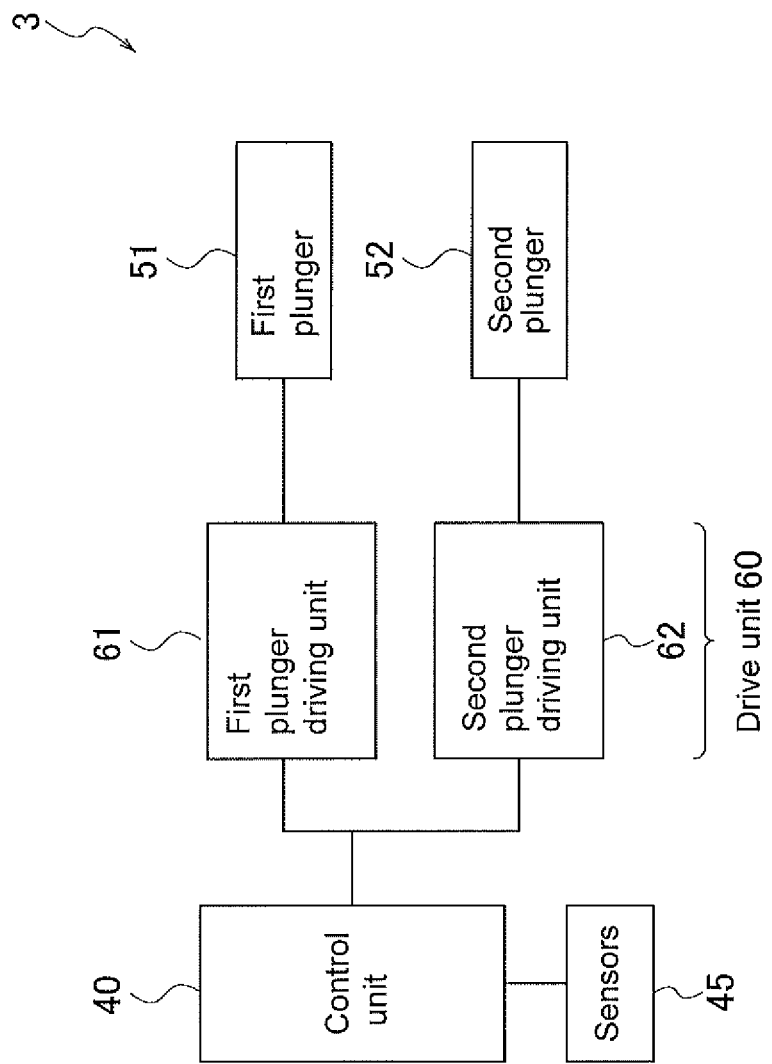
FIG. 7 is a block diagram showing an example of the configuration of a drive unit.

FIG. 7 is a block diagram showing an example of the configuration of a drive unit 60. The control unit 40 is a computer, using the information received from the sensors 45 or the like, controls the delivering device 3, separating device 4, introducing device 5, and the punching device 9. The drive unit 60 moves the first plunger 51 and the second plunger 52 in the first direction (height direction D1). The drive unit 60 includes a first plunger driving unit 61 and a second plunger driving unit 62. Each of the first plunger driving unit 61 and the second plunger driving unit 62 is connected to the control unit 40. The first plunger driving unit 61 is connected to the first plunger 51. The second plunger driving unit 62 is connected to the second plunger 52. The first plunger driving unit 61 and the second plunger driving unit 62 can be arranged at a desired position in the internal space 53 of the peripheral wall portion 50 by moving the first plunger 51 and the second plunger 52 in the first direction (height direction D1) respectively under the control of the control unit 40.

In the delivery device 3 having the configuration shown in FIG. 7, the control unit 40 controls the first plunger driving unit 61 to move the first plunger 51. The control unit 40 controls the second plunger driving unit 62 to move the second plunger 52. The control unit 40 controls the first plunger driving unit 61 and the second plunger driving unit 62 at the same time to move the first plunger 51 and the second plunger 52 simultaneously.

The drive unit 60 may, for example, use a servo motor or an air cylinder. That is, the first plunger driving unit 61 and the second plunger driving unit 62 can be constituted by the servo motor or the air cylinder. Each of the first plunger driving unit 61 and the second plunger driving unit 62 may be constituted by a plurality of air cylinders connected in series with each other.

The delivery device 3 further includes sensors 45 for detecting the position of the first plunger 51 and the position of the second plunger 52. The control unit 40 receives a detection result of the sensors 45 that directly or indirectly indicate the position of the first plunger 51 and the position of the second plunger 52. The control unit 40 controls the drive unit 60 based on the detection result of the sensors 45. For example, an optical sensor (not shown) including a light emitting element and a light receiving element can be used as the sensors 45 to directly detect the position of the first plunger 51 and the position of the second plunger 52. When configuring the first plunger 51 and second plunger 52 by the servo motor, the position of the first plunger 51 and the second plunger 52 can be indirectly detected based on the driving state of the servo motor and/or the control signal from the control unit 40 to drive the servo motor.

The control unit 40 fills the amount of the meat-containing raw material to be delivered from the delivery device 3 so that the meat-containing raw material to be filled in the molding space Sm has a desired density (S13 in FIG. 3). When the meat-containing raw material to be filled becomes a desired density, the control unit 40 drives the introducing device 5 and introduces a gel-like material into the inside of the meat-containing raw material via the introduction needle 5a (S14 in FIG. 3). After introducing the gel-like material into the meat-containing raw material, the control unit 40 drives the introducing device 5 to retract the introduction needles 5a from the molding space Sm (S15 in FIG. 3).

The control unit 40 can fill the meat-containing raw material in the molding space Sm so as to have a desired density by using the capacity of the molding space Sm obtained in advance and the amount of the meat-containing raw material to be delivered from the delivery device 3 to the molding space Sm. For example, the control unit 40, with the sensors 45 including a light emitting element and a light receiving element, directly detects the position of the first plunger 51 and the position of the second plunger 52. The control unit 40 can calculate the amount of the meat-containing raw material to be delivered to the molding space Sm based on the displacement amount of the position.

DESCRIPTION OF SYMBOLS

1 Food production system
2 Supply device
3 Delivery device
4 Separation device
4a Shutter members
5 Introducing device
5a introduction needle
6 Conveying device
7 First relay guide
8 Second relay guide
9 Punching device
9a punching rods
11 Hopper
15 First port
16 Second port
21 First molding die
22 Second molding die
31 Filling hole
32 Release hole
33 Punching hole
40 Control unit
89 Delivery conveyor
100 Meat-containing raw materials
103 Separated food materials
Rh1 first horizontal area
Rh2 second horizontal area
50 Peripheral wall portion
51 First plunger
52 Second plunger
53 Internal space
D1 Height direction
D2 Horizontal direction
50a Inner wall surface
60 Drive unit
40 Control unit
45 Sensors
60 Drive unit
61 First plunger driving unit
62 Second plunger driving unit

INDUSTRIAL APPLICABILITY

According to the method of the present invention, a gel-like material that is excellent in terms of filling suitability and has no burden on a filling machine can be locally and quantitatively filled into a meat processed food, and as a result, a meat processed food having juicy texture can be stably produced. Therefore, the present invention is useful for the production of meat processed products.

All publications, patents and patent applications cited in the present description are incorporated herein by reference in their entirety.

The invention claimed is:

1. A method for introducing a gel-like material into a meat-containing raw material, comprising the steps of:
delivering the meat-containing material by a delivery device towards a separating device and filling a molding space of the separating device with the meat-containing material to mold the meat-containing material, the separating device comprising a molding die configured to define the molding space, and the delivery device being configured to deliver the meat-containing raw material into the molding space of the separating devise;
injecting the gel-like material into the meat-containing raw material by an introducing device via an introduction needle after the meat-containing material is delivered to the molding space, so that the gel-like material is introduced into a predetermined position inside the meat-containing raw material located in the molding space of the separating device, the introducing device configured to introduce the gel-like material into the predetermined position inside the meat-containing raw material filled in the molding space; and
separating by the separating device a predetermined amount of the meat-containing raw material from the meat-containing material, into which the gel-like material has been introduced in the step of injecting,
wherein a control unit controls the introducing device so that the gel-like material is discharged into the meat-containing raw material.

2. The method for introducing a gel-like material into a meat-containing raw material according to claim 1, wherein the delivery device receives the meat-containing raw material being delivered at a first gauge pressure, and delivers the meat-containing raw material toward the separating device by a second gauge pressure lower than the first gauge pressure.

3. A method for introducing a gel-like material into a meat-containing raw material, comprising the steps of:
- delivering the meat-containing material by a delivery device towards a separating device, the separating device comprising a molding die configured to define a molding space to mold the meat-containing material, and the delivery device comprising a relay guide and being configured to deliver the meat-containing raw material into the molding space of the separating devise through the relay guide;
- injecting the gel-like material into the meat-containing raw material by an introducing device via an introduction needle in a process of passing through the relay guide toward the molding space and before the meat-containing material is delivered to the molding space, so that the gel-like material is introduced into a predetermined position inside the meat-containing raw material, the introducing device being configured to introduce the gel-like material to the predetermined position inside the meat-containing raw material;
- filling the molding space of the separating device with the meat-containing material, into which the gel-like material has been introduced in the step of injecting, by delivering the meat-containing raw material to the separating device through the relay guide; and
- separating by the separating device a predetermined amount of the meat-containing raw material from the meat-containing material, into which the gel-like material has been introduced in the step of injecting,
- wherein a control unit controls the introducing device so that the gel-like material is discharged into the meat-containing raw material, and
- wherein the step of introducing the gel-like material into the meat-containing raw material by the introducing device is performed in parallel with the step of separating the meat-containing raw material in the separation device.

4. The method according to claim 1, further comprising a step of producing a meat processed food by cooking the meat-containing raw material, into which the gel-like material has been introduced in the step of injecting.

5. The method according to claim 3, further comprising a step of producing a meat processed food by cooking the meat-containing raw material, into which the gel-like material has been introduced in the step of injecting.

6. The method according to claim 4, wherein the meat processed food is a hamburger steak, a meatball, a ground meat cutlet, or a Japanese chicken meatball, tsukune.

7. The method according to claim 5, wherein the meat processed food is a hamburger steak, a meatball, a ground meat cutlet, or a Japanese chicken meatball, tsukune.

\* \* \* \* \*